(12) United States Patent
Dexter et al.

(10) Patent No.: US 9,165,578 B2
(45) Date of Patent: Oct. 20, 2015

(54) SWAGE MOUNT FOR HARD DISK DRIVES

(71) Applicant: Intri-Plex Technologies, Inc., Santa Barbara, CA (US)

(72) Inventors: David Django Dexter, Goleta, CA (US); Paul Wesley Smith, Santa Barbara, CA (US); Adam Donald Sutton, Pleasanton, CA (US); Ryan John Schmidt, Santa Barbara, CA (US)

(73) Assignee: INTRI-PLEX TECHNOLOGIES, INC., Santa Barbara, CA (US)

( * ) Notice: Subject to any disclaimer, the term of this patent is extended or adjusted under 35 U.S.C. 154(b) by 0 days.

(21) Appl. No.: 14/199,621

(22) Filed: Mar. 6, 2014

(65) Prior Publication Data
US 2015/0255095 A1 Sep. 10, 2015

(51) Int. Cl.
*G11B 5/48* (2006.01)
*G11B 21/16* (2006.01)

(52) U.S. Cl.
CPC ............ *G11B 5/4826* (2013.01); *G11B 5/4833* (2013.01)

(58) Field of Classification Search
CPC .... G11B 5/4833; G11B 5/4826; G11B 5/486; G11B 5/5552
USPC ............................................ 360/244.2–244.7
See application file for complete search history.

(56) References Cited

U.S. PATENT DOCUMENTS

| 5,097,584 | A | 3/1992 | Cain et al. | |
|---|---|---|---|---|
| 5,142,770 | A | 9/1992 | Cain et al. | |
| 5,591,277 | A | 1/1997 | Braunheim | |
| 5,689,389 | A | 11/1997 | Braunheim | |
| 5,696,653 | A | 12/1997 | Lacey | |
| 5,796,555 | A | 8/1998 | Aoyagi et al. | |
| 5,844,675 | A | 12/1998 | Hayes et al. | |
| 5,948,997 | A | 9/1999 | Schmidt | |
| 6,183,841 | B1 | 2/2001 | Hanrahan et al. | |
| 6,231,698 | B1 | 5/2001 | Braunheim et al. | |
| 6,351,349 | B1 | 2/2002 | Braunheim et al. | |
| 6,417,994 | B1 | 7/2002 | Yim et al. | |
| 7,304,824 | B2 | 12/2007 | Brink et al. | |
| 7,324,307 | B2 | 1/2008 | Brink et al. | |
| 8,116,038 | B1 * | 2/2012 | Zhang et al. | 360/244.5 |
| 8,142,638 | B2 | 3/2012 | Brink et al. | |
| 2002/0075605 | A1 * | 6/2002 | Nishida et al. | 360/294.4 |
| 2003/0202293 | A1 * | 10/2003 | Nakamura et al. | 360/294.4 |
| 2005/0128643 | A1 * | 6/2005 | Wobbe et al. | 360/244.2 |
| 2005/0152068 | A1 * | 7/2005 | Erpelding | 360/245.9 |
| 2006/0227463 | A1 * | 10/2006 | Wright et al. | 360/244.2 |
| 2009/0147406 | A1 * | 6/2009 | Otake et al. | 360/244.5 |
| 2009/0262463 | A1 * | 10/2009 | Yokota et al. | 360/290 |
| 2010/0208390 | A1 * | 8/2010 | Hanya et al. | 360/245.2 |
| 2011/0141625 | A1 * | 6/2011 | Fuchino | 360/244.5 |
| 2012/0087047 | A1 * | 4/2012 | Imuta | 360/294 |

* cited by examiner

*Primary Examiner* — Adam B Dravininkas

(57) ABSTRACT

A swage mount is provided for attaching a head suspension assembly to a head actuator arm for a hard disk drive. The swage mount has a flange body with a thickness for providing clearance from the underlying disk. The swage mount may have a tip for in-plane movement. The tip may be 'T' shaped. The tip has a thickness that is greater than the thickness of the flange body for withstanding out-of-plane loads and for enhancing performance of the hard disk drive, for example, during reading/writing of data using the head. Mass properties of the swage mount, the twisting/bending yield load, modal frequency responses, and other performance metrics are analyzed to design the dimensions of the swage mount having favorable in-plane compliance and superior out-of-plane robustness.

11 Claims, 9 Drawing Sheets

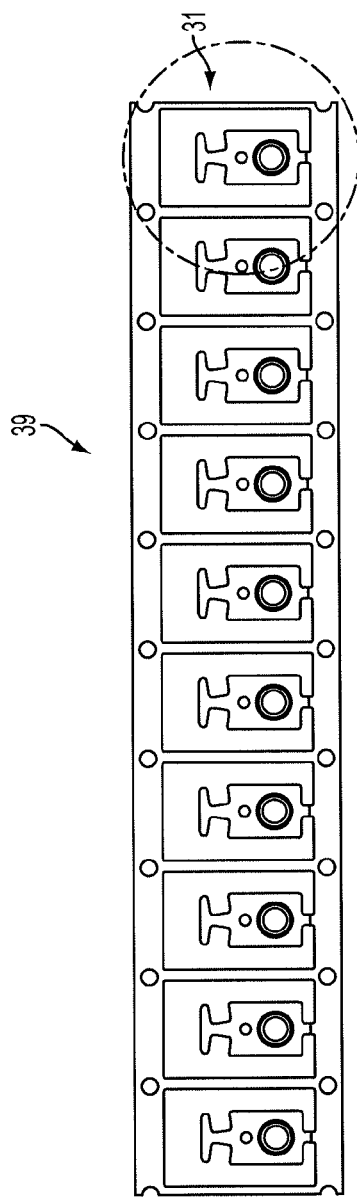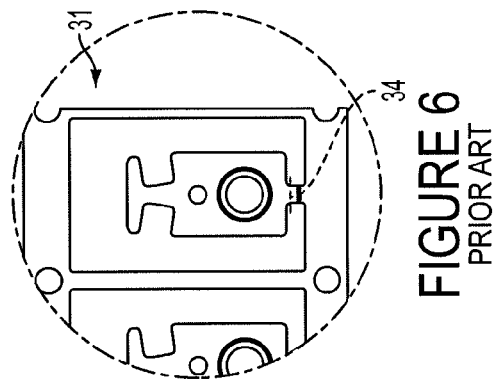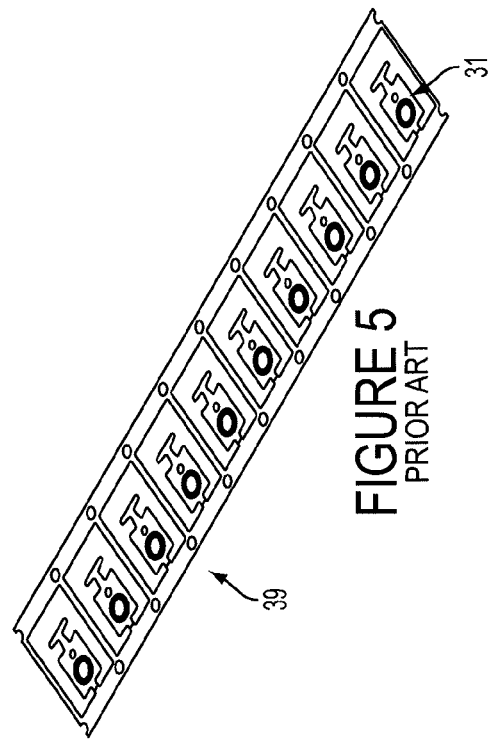
FIGURE 4
PRIOR ART
FIGURE 5
PRIOR ART
FIGURE 6
PRIOR ART

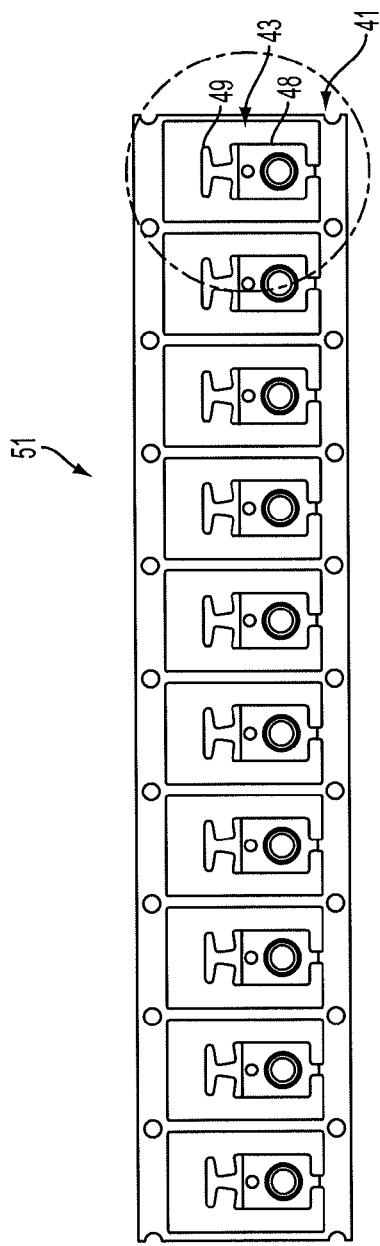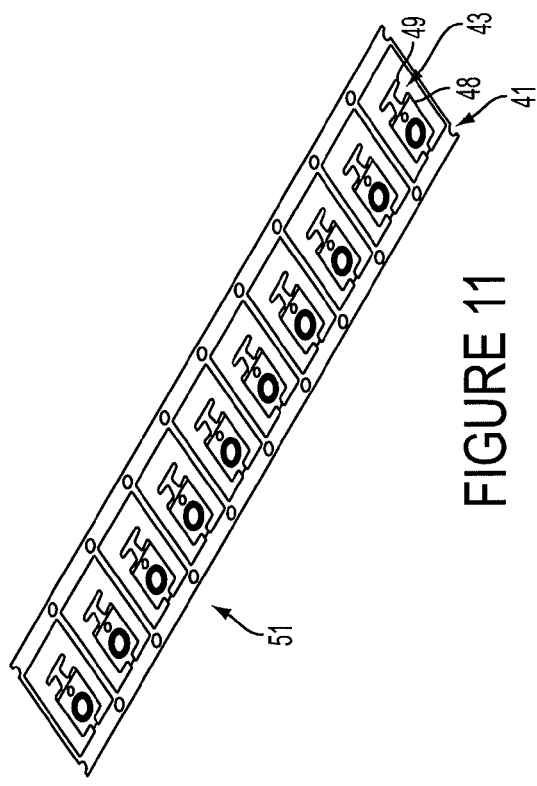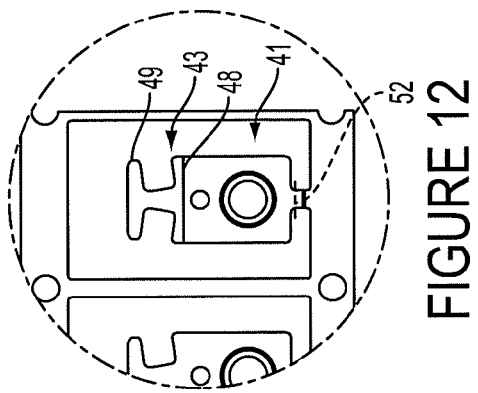
FIGURE 10
FIGURE 11
FIGURE 12

SWAGE MOUNT FOR HARD DISK DRIVES

BACKGROUND OF THE INVENTION

1. Field of the Invention

The present invention relates to disk head assemblies for supporting read/write heads adjacent rotating disks in disk drives and more particularly, to a swage mount for attaching a head suspension assembly to a head actuator arm.

2. Description of Related Art

In hard disk drives, data are stored on surfaces of a plurality of rotatable disks mounted on a housing of the drive. Transducer heads that write data to and read data from the disk surfaces are supported by an actuator that positions the transducer heads in alignment with concentric data tracks defined on the disks. Each transducer head is attached to one end of a head suspension that is connected to an actuator arm that extends from the actuator body.

It has been common practice for hard disk drives to incorporate dual stage actuation swage mounts, for example, as shown in FIG. 1. FIG. 1 is a perspective illustration of a head suspension assembly 11 that may be connected to an actuator arm (not shown). The head suspension assembly may be swaged onto the actuator arm by inserting and swaging the hub 16 of a swage mount 15 into a hole in the actuator arm positioned above the disk. The head suspension assembly 11 may include a swage mount 12 having a flange portion 13 and a hub 16 surrounding an aperture of the flange portion 13 and extruding out of plane.

Primary actuation may be performed, for example, using a voice coil motor. In addition, at least one of a secondary actuation near the swage mount 15 or a direct movement of the head near the flexure 25 may be performed.

Piezoelectric transducers (PZTs) 17 may be provided as secondary actuators that mechanically position the head in a planar direction in response to applied electrical charge. The PZTs 17 actuate the head to move or vibrate in the x-z plane (see for example, the x, y and z axes shown in FIG. 3). The PZTs 17 may have conductive contacts 19. A hinge 21 may connect the swage mount 15 to a load beam 23 that acts as a spring that forces the head against the disk surface. A flexure 25 may be provided to locate the head, which is bonded underneath the flexure 25. The flexure 25 locates the head rigidly in the x-z plane while allowing the head to rotate about the x and z axes. In one embodiment, the head flies very close to the disk surface without contacting it in order to read and/or write very small magnetic bits. Rotation of the head maintains proper fly height and attitude.

In another embodiment, the swage mount 12 of FIG. 1 may extend into a tip (for example, with a 'T' shape) such that a stiffener 14 of the head suspension assembly 11 is eliminated, and the hinge 21 and the load beam 23 are welded to the tip as shown, for example in FIG. 2.

FIG. 2 is a top view illustration of a head suspension assembly 30 having a swage mount 31. The swage mount 31 has a flange portion 37 with a flange body 32 and a tip 33. A hub 35 extrudes out of plane from the flange body 32. The contacts 19 may connect the PZT 17 to a ground path. The contacts 19 may be epoxies for providing a conductive link between the swage mount 31 (for example, the 'T' shaped tip 33) and the PZTs 17.

FIG. 3 shows the swage mount 31 in isolation. The swage mount 31 includes a flange portion 37 having a flange body 32 and a tip 33. The tip 33 may be shaped, for example, similar to the letter 'T.' PZTs (similar to PZTs 17 discussed above with respect to FIG. 2) may be incorporated to bias the 'T' shaped tip 33 to deform substantially in-plane (in the x-z plane). As a result, positive or negative charges may be applied to the PZTs resulting in their expansion and/or contraction which then moves the head to align with the proper track for a read/write process on the underlying disk.

The swage mount 31 has a uniform thickness along the surface that extends from the flange portion 37 to the 'T' shaped tip 33. As the flange portion 37 and the tip 33 become thinner for providing additional clearance between the swage mount 31 and the disk underneath, the tip 33 becomes more susceptible to bending and/or twisting. The thin tip 33 lacks sufficient robustness for withstanding out-of-plane loads during shipping, handling, or assembly. Manufacturers in the art have sought to employ greater care in shipping, handling, or assembly methods, but such methods are costly and often ineffective in avoiding out-of-plane loads that cause permanent deformation of the swage mount and result in costly yield loss. Because the swage mounts known in the art have inadequate out-of-plane robustness, some manufacturers provide the swage mounts on a fret (a flat sheet for delivery of swage mounts) to help protect them, as shown in FIG. 4.

FIGS. 4-6 show swage mounts 31 with uniform thicknesses manufactured on a fret 39. A drawback of utilizing frets 39 is that the manufacturing process adds to processing and shipping costs. Manufacturing using frets 39 can also create cutting burrs and particles when the swage mount is removed from the strip along the trim line 34 before or after assembly. The burrs and particles have an adverse impact on drive reliability.

Beyond concerns involving shipping, handling, or assembly, the swage mounts known in the art suffer from poor drive performance. More particularly, the thin 'T' shaped tip 33 often has out-of-plane mechanical resonance modes that are too low in frequency and/or too high in amplitude, and has high displacements due to mechanical shock on the drive, resulting in poor drive performance.

There is a need in the art for a swage mount with higher manufacturing throughput and lower cost handling, shipping, and assembly in order to decrease the likelihood of permanent deformation of the swage mount or the tip. There is a need in the art for a swage mount that on the one hand, has a relatively thin flange body for providing sufficient clearance for the disk, and on the other hand, has a thicker tip with high out-of-plane yield robustness. Beyond shipping, handling, or assembly, it is critical for the tip to have favorable compliance in an in-plane direction (for example, along the x-z plane as shown in FIG. 3), yet robustness and high stiffness in an out-of-plane direction (for example, along the y axis as shown in FIG. 3) for high out-of-plane resonant frequencies, low out-of-plane resonant mode amplitudes, and small shock induced deformations, to achieve improved drive performance.

SUMMARY OF THE INVENTION

A swage mount is provided for attaching a head suspension assembly to a head actuator arm. The swage mount has a relatively thin flange body for providing sufficient clearance from the disk positioned underneath the swage mount. The swage mount has a tip for in-plane actuation. The tip extends from the flange body, and has a thickness greater than the thickness of the flange body. The thicker tip can be directed toward the middle of the actuator arm so as not to reduce the flange to disk clearance. The tip has a first part proximal to the flange body, and a distal part that is narrower than its proximal part. For example, the tip may be 'T' shaped with the stem part starting from the proximal end and with the cross-bar part positioned at the distal part. The swage mount maintains favorable in-plane compliance for actuation of the tip, yet withstands out-of-plane loads due to the greater thickness of the tip.

In one embodiment, a swage mount is provided that includes a planar flange body having a first flange body part and a second flange body part. The second flange body part has four sides and a predetermined thickness greater than a predetermined thickness of the first flange body part. A hub surrounds an aperture in the first flange body part. A tip extends from a side of the second flange body part substantially in the plane of the flange body. The tip has a predetermined thickness that is substantially the same as the predetermined thickness of the second flange body part.

BRIEF DESCRIPTION OF THE DRAWINGS

The exact nature of this invention, as well as the objects and advantages thereof, will become readily apparent from consideration of the following specification in conjunction with the accompanying drawings in which like reference numerals designate like parts throughout the figures thereof and wherein:

FIGS. 4 and 5 are top view and perspective illustrations, respectively, of swage mounts with uniform thicknesses manufactured on a fret according to an embodiment known in the art, FIG. 6 is an exploded view of the swage mount shown in FIG. 4 according to an embodiment known in the art, FIGS. 10 and 11 are top view and perspective illustrations, respectively, of swage mounts with uniform thicknesses manufactured on a fret, according to certain embodiments of the present invention, FIG. 12 is an exploded view of the swage mount shown in FIG. 10, according to certain embodiments of the present invention.

DETAILED DESCRIPTION OF THE PREFERRED EMBODIMENTS

Out-of-plane robustness is critical for withstanding out-of-plane loads during shipping, handling, or assembly and furthermore for optimal performance of the hard disk drive. Unlike the swage mounts known in the art with a uniform thickness along the flange body and the tip, the tip of the present invention can withstand significantly higher out-of-plane loads such as twisting or bending due to its greater thickness. The swage mount of the present invention maintains favorable in-plane compliance for actuation of the tip, yet withstands out-of-plane loads. The robust swage mount of the present invention can be shipped, handled, or assembled individually with a lower cost.

Various merits for performance of the swage mount are analyzed for designing the thicknesses of the swage mount. Mass properties of the swage mount, the twisting/bending yield load, modal frequency responses, in-plane/actuation direction stiffness and other performance metrics may be analyzed to design a swage mount with a relatively thin flange body and a thicker tip.

Figure 1:
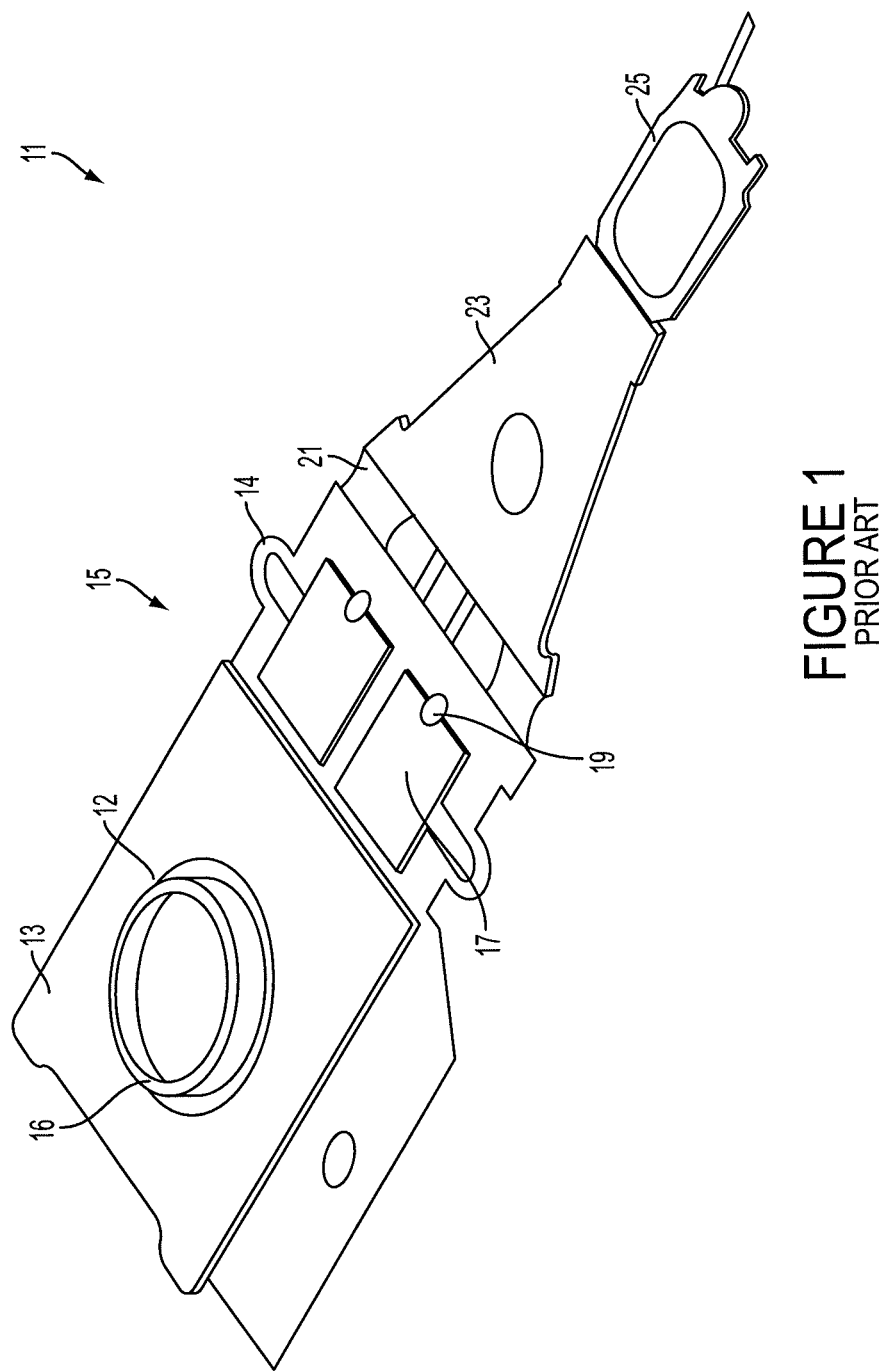
FIG. 1 is a perspective illustration of a head suspension assembly for a hard disk drive according to an embodiment known in the art.
Figure 2:
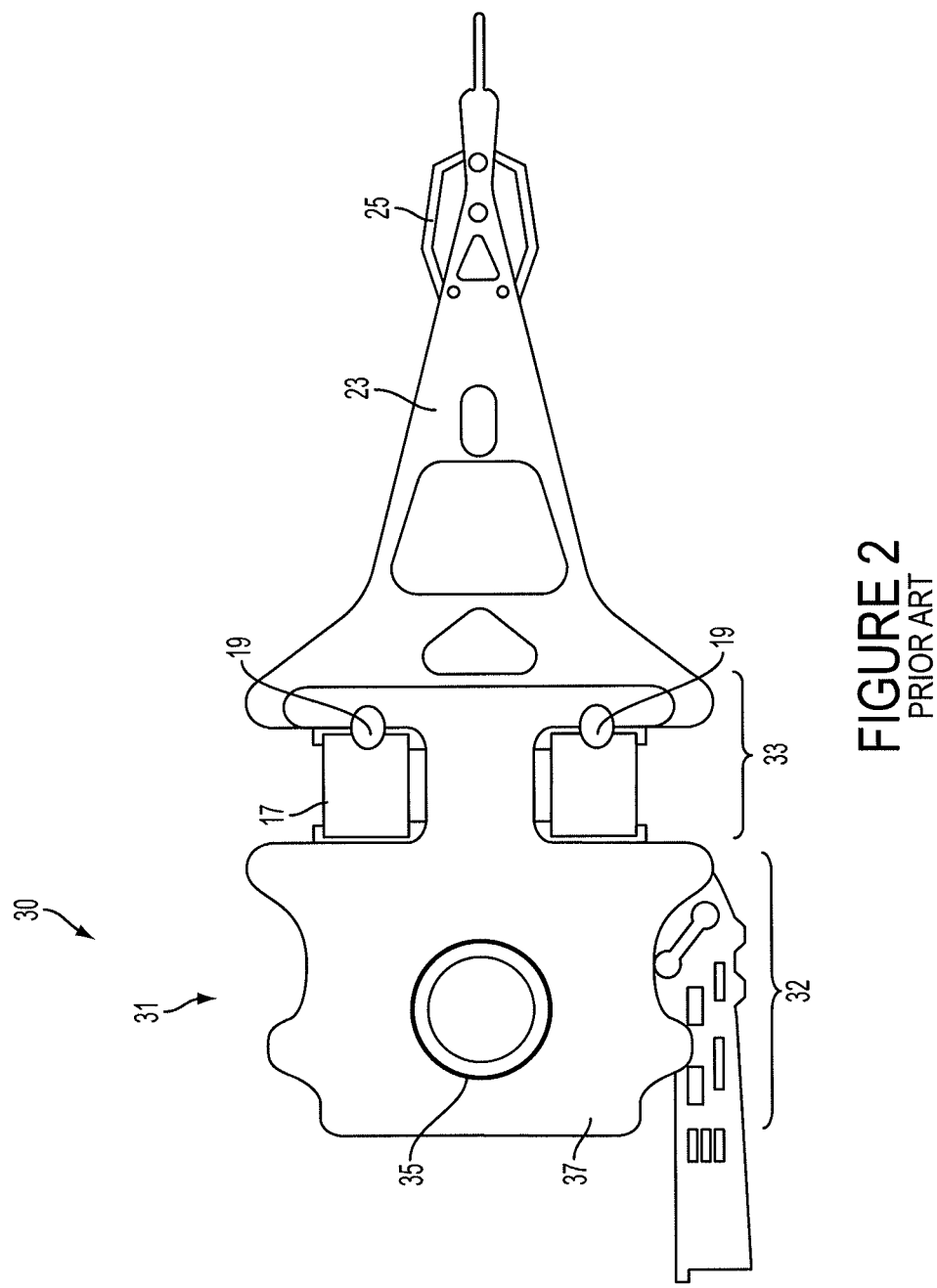
FIG. 2 is a top view illustration of a head suspension assembly having a swage mount for a hard disk drive according to an embodiment known in the art.
Figure 3:
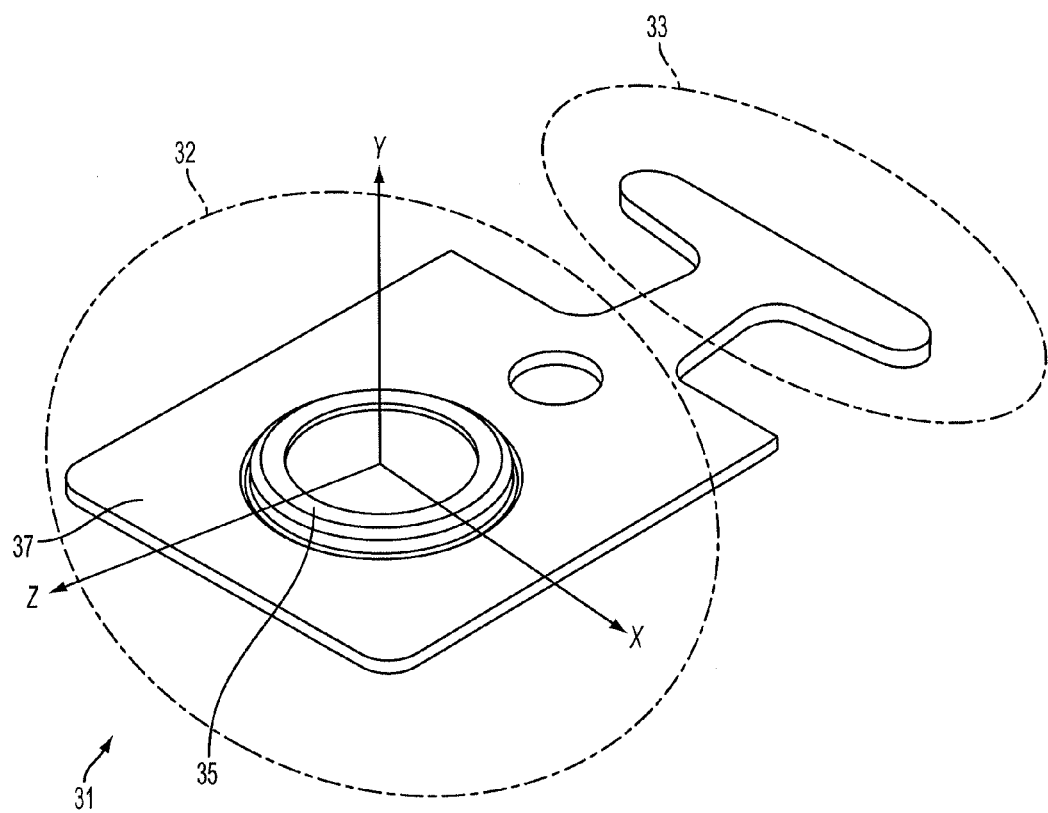
FIG. 3 is a perspective illustration of a swage mount for a hard disk drive according to an embodiment known in the art.
Figure 7:
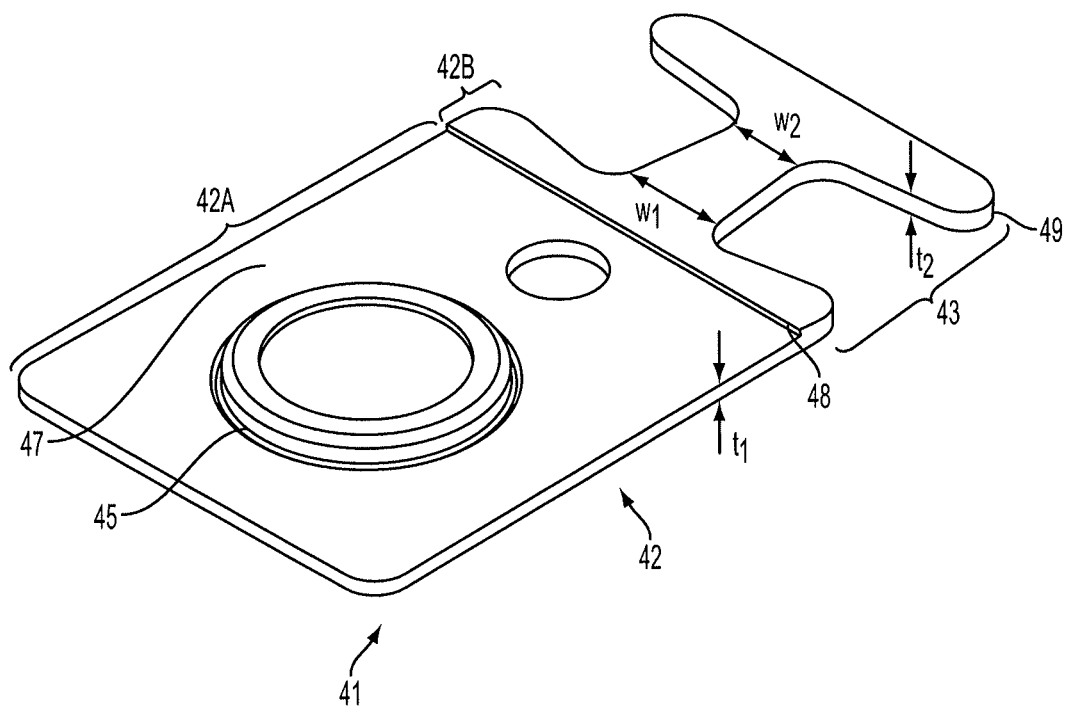
FIG. 7 is a perspective illustration of a swage mount for a hard disk drive having a thicker tip, according to certain embodiments of the present invention.

FIG. 7 is a perspective illustration of a swage mount for a hard disk drive having a thicker tip for withstanding out-of-plane loads, according to certain embodiments of the present invention. One unique advantage of the present invention is to provide a tip 43 that is thicker than a relatively thin flange body 47. The tip 43 may include a 'T' shaped tip 49 that is capable of withstanding bending, twisting, and/or other out-of-loads. This unique advantage is critical for minimizing cost and damages as a result of shipping, handling, or assembly.

Even beyond shipping, handling, or assembly, it is desirable for the 'T' shaped tip 49 to be stiff/robust in an out-of-plane direction for optimal performance of the hard disk drive. More particularly, it is desirable for the 'T' shaped tip 49 to have high in-plane compliance to allow the PZTs to freely bias in-plane movement of the 'T' shaped tip 49. This allows the PZTs to effectively direct the head during, for example, a reading/writing process on the hard disk.

The 'T' shaped tip 49 has a thickness t2 that is greater than t1 for enhancing out-of-plane robustness of the 'T' shaped tip 49. A thickness step 48 may separate the flange body 42 into a first flange body part 42A having thickness t1 and a second flange body part 42B having thickness t2. Although a thickness step 48 is shown in FIG. 7, smooth or other forms of transition from thickness t1 to thickness t2 may be utilized without limiting the scope of the present invention. In another embodiment, both the thickness of the second flange body part 42B and the thickness of the tip 49 are greater than the thickness of the first flange body part 42A, yet the thickness of the second flange body part 42B and the thickness of the tip 49 are not equal.

It is desirable to provide additional clearance between the flange body 42 and the disk positioned underneath it by providing a relatively thin flange body 42. This prevents or reduces the likelihood of contact between the swage mount 42 and the disk surface during a mechanical shock event. In one embodiment, when the thicker tip swage mount is utilized, the clearance between the flange body 42 and the disk can be maintained or increased. The maintained or additional clearance may advantageously allow incorporation of a higher number of actuator arms and/or heads into the same hard disk drive height, or allow for a shorter overall drive height which is critical for certain low profile devices.

Figure 8:
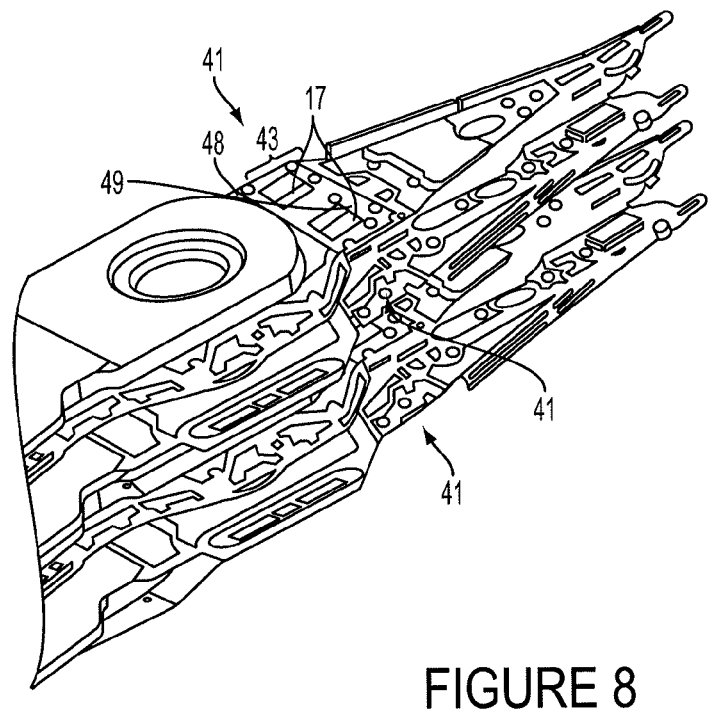
FIGS. 8 and 9 are perspective and side view illustrations, respectively, of a thicker tip swage mounts assembled in a head stack with the thickness steps oriented toward the middle of the arms, according to certain embodiments of the present invention.
Figure 9:
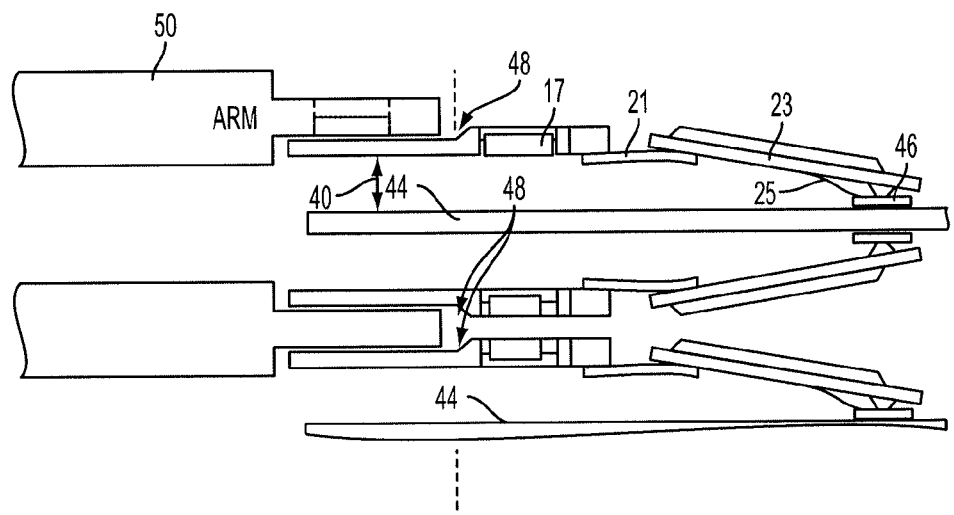

For example, FIGS. 8 and 9 show thicker tip swage mounts 41 assembled in a head stack with the thickness steps 48 oriented toward the middle of the arms 50 so that the clearance 40 between the swage mount 41 and the disk 44 is not reduced. Multiple swage mounts 41 may be similarly structured and positioned in parallel, as shown in FIGS. 8 and 9.

Referring back to FIG. 7, the flange body 42 may be coined (for example, using a die) to a greater degree than the tip 43 for manufacturing a flange body 42 thinner than the tip 43. Other manufacturing methods can be utilized to provide varying thickness without limiting the scope of the present invention. In other embodiments, the flange portion 47 may have a thinner thickness t1 in an area surrounding the hub 45 yet one or more different thicknesses over the remainder of the flange body 42.

In one embodiment, the swage mounts 41 may be manufactured on a fret 51, as shown in FIGS. 10-12. The swage mount 41 may be removed from the strip along the trim line 52 before or after assembly.

In another embodiment, the swage mounts of the present invention can be individually processed without use of frets. Individual processing reduces costs associated with delivery on a fret. Furthermore, individual processing improves drive reliability because it prevents problems associated with cutting burrs and particles resulting from removing parts from a fret frame during processing.

Figure 13:
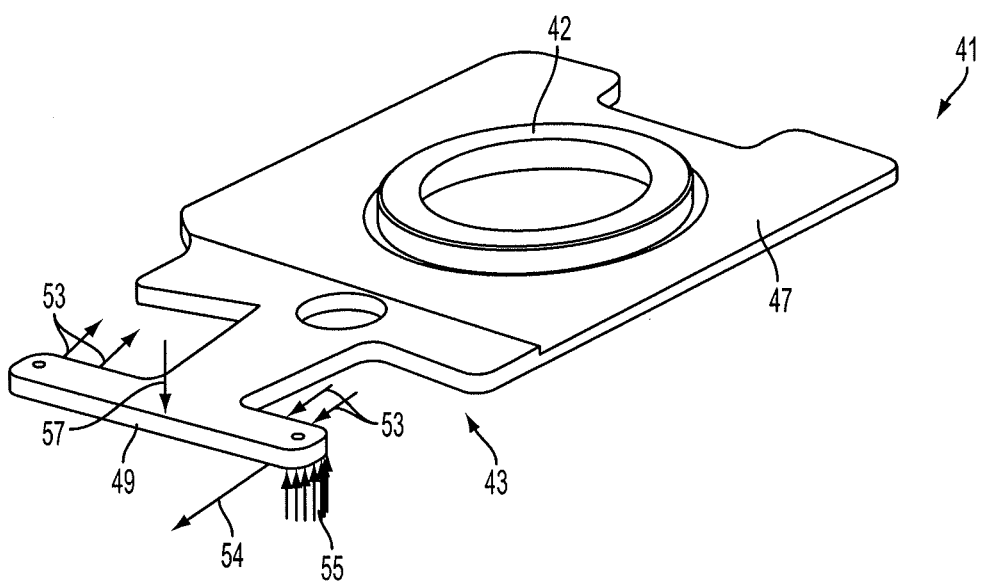
FIG. 13 is a perspective illustration of a swage mount along with twisting, bending, and in-plane loads/forces that are applied for testing, according to certain embodiments of the present invention.

FIG. 13 is a perspective illustration of a swage mount 47 along with twisting, bending, and in-plane loads/forces that are applied for testing. PZTs may be positioned in proximity of arrows 53 and would expand and/or contract in response to application of electrical charges. That provides an angle to the 'T' shaped tip 49 of the swage mount 41. If t2 is too thick, the in-plane compliance that the PZTs are pushing against becomes too low. Referring back to FIG. 7, as a result, at the design stage, w1 and w2 can be changed to compensate for the added thickness and render the swage mount 41 more compliant in the plane.

Referring to FIG. 13, the in-plane compliance may be measured by applying a load normal to, and in the center of, the PZT mounting surfaces on the inside portion of the 'T' shaped tip 49. The loads may be arranged in a "push-pull" configuration. For example, a reported load of 4 N implies a 4 N load on each side of the stem part of the 'T' shaped tip 49, in opposite directions. The displacement 54 is the maximum in-plane value as computed at the tip of the cross-bar of the 'T' shaped tip 49. The compliance may be measured in μm/N (micro meters/Newton).

The 'T' shaped tip 49 is capable of withstanding twisting forces 55 and bending forces 57. An objective of the design is to prevent the swage mount 41 from being permanently deformed when an out-of-plane prescribed load is applied. It is desirable for the swage mount 41 to withstand a high load, when twisted or bent, before the swage mount 41 yields to the twisting/bending loads. For example, data may be generated by controlling displacement of a 1 millimeter (mm) diameter load pin that exerts the force, and by recording the resulting load reactions at various displacements. The load at yield may be measured, for example, in Newtons, by determining the point at which the load-displacement curve becomes non-linear and/or by applying and removing loads of various levels and measuring permanent swage mount deformation.

Measured or numerically modeled peak Von Mises stress (MPa) can also be plotted as a function of load to determine at what load value the known yield stress of the material is exceeded such that the swage mount is permanently deformed. It is also desirable to have high out of plane stiffness to keep mechanical resonance frequencies high during drive operation. Twisting stiffness ($K_{twist}$) and bending stiffness ($K_{bend}$) can be measured before yielding in units of N/mm (Newtons/millimeter).

Figure 14:
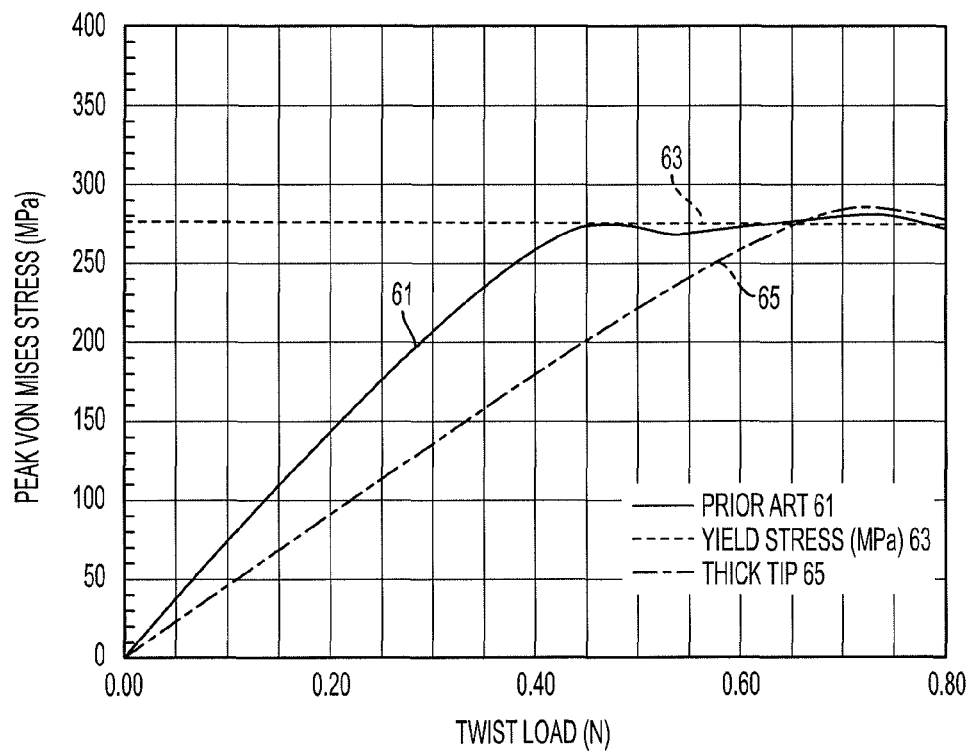
FIG. 14 is a performance graph showing twisting robustness of a standard embodiment known in the art compared with an embodiment of the present invention with a thick tip.

FIG. 14 is a performance graph showing twisting robustness of a standard embodiment known in the art 61 compared to an embodiment with a thicker tip 65 according to an embodiment of the present invention. As shown in FIG. 14, graph 61 shows the prior art swage mount (with uniform thickness) yielding, indicated by its intersection with the dashed yield strength line 63, at a twisting load of about 0.45 N while the "Thick Tip" graph 65 shows the swage mount according to an embodiment of the present invention yielding at about 0.65 N. The thicker t2 flange section significantly improves twisting robustness, as compared with the uniform thickness prior art swage mount which yields at a significantly lower twisting load.

Figure 15:
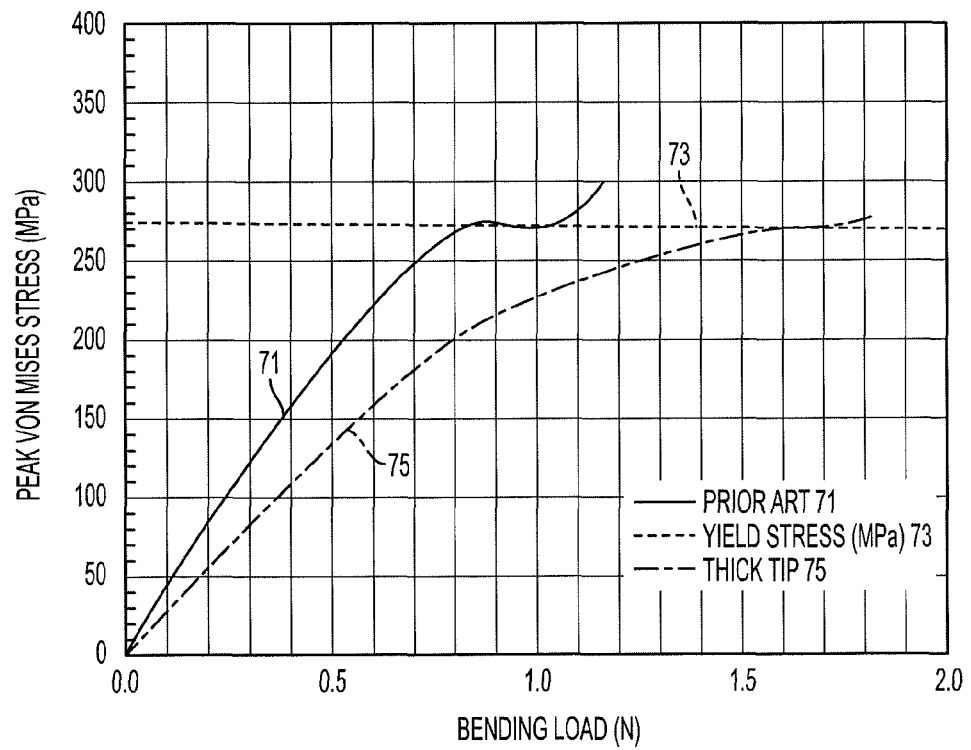
FIG. 15 is a performance graph showing bending robustness of a standard embodiment known in the art compared with an embodiment of the present invention with a thick tip.

FIG. 15 is a performance graph showing bending robustness of a standard embodiment known in the art 71 along with the standard embodiment altered to have a thicker 'T' shaped tip 75 according to an embodiment of the present invention. As shown in FIG. 15, graph 71 shows the prior art swage mount (with uniform thickness) yielding, indicated by its intersection with the dashed yield strength line, at a bending load of about 0.85 N while the "Thick Tip" graph 75 shows the swage mount according to an embodiment of the present invention yielding at about 1.6 N. The thicker t2 flange section significantly improves bending robustness, as compared with the uniform thickness prior art swage mount which yields at a significantly lower bending load.

Table 1 below lists merits of performance set forth above of four swage mounts with different dimensions. The descriptions refer to different profiles and geometries of the compared swage mounts.

| Description | Compliance (μm/N) | Twist Yield Load (N) | Bending Yield Load (N) | $K_{twist}$ (N/mm) | $K_{bend}$ (N/mm) | t1 (mm) | t2 (mm) | w1 (mm) | w2 (mm) |
|---|---|---|---|---|---|---|---|---|---|
| −02 | 4.7 | 0.46 | 0.85 | 13.7 | 32.7 | 0.150 | 0.150 | 1.039 | 0.750 |
| −001 | 4.0 | 0.61 | 1.35 | 18.0 | 48.2 | 0.150 | 0.175 | 1.039 | 0.750 |
| −015 | 3.8 | 0.62 | 1.70 | 22.0 | 55.4 | 0.150 | 0.188 | 1.039 | 0.750 |
| −015−.15 w | 11.6 | 0.41 | 1.15 | 14.5 | 38.6 | 0.150 | 0.188 | 0.750 | 0.450 |

For example, swage mount −02 is a swage mount known in the art having a uniform thickness of 0.150 mm over the flange body 42 and the tip 43. This model was modified, according to an embodiment of the present invention, to increase the thickness of the tip 43 for improving out-of-plane robustness. w1 and w2 may also be altered to maintain or improve in-plane compliance of the tip 43.

For example, the twist yield load, the bending yield load, $K_{twist}$, and $K_{bend}$ all improve significantly when t1 is maintained to be as thin as the standard model (−02) and t2 is increased to 0.175 mm, as shown in model −001. Depending on the PZT performance and stroke requirements, the minor decrease in compliance in this range may prove beneficial for robustness.

As the standard model −02 is further altered to have a tip 49 with thickness t2 increased to 0.188 mm, the twist yield load, the bending yield load, $K_{twist}$, and $K_{bend}$ all improve significantly (as shown in model −015) even to a greater extent than −001.

Because compliance may decrease when thickness t2 and mass is increased without changing other parameters, w1 and w2 may be altered to compensate for the added mass and thickness. For example, w1 and w2 may be reduced to 0.750 mm and 0.450 mm, respectively, as shown in model −016− 0.15w. This allows the compliance to improve significantly by 47%. The bending yield load, $K_{twist}$, and $K_{bend}$ improve as well with the foregoing modification.

As set forth above with respect to FIGS. 7 and 13-15 and Table 1, performance metrics may be defined, and t1 and t2 may be modified to achieve desirable out-of-plane robustness. w1 and w2 may be further modified to compensate for the added thickness of t2 to achieve desirable in-plane compliance and out-of-plane robustness.

In one embodiment, the following dimensions provided unexpected and superior performance results as defined by the foregoing performance metrics (including favorable out-of-plane robustness and in-plane compliance): 0.025 mm≤t1≤0.250 mm, 0.075 mm≤t2≤0.305, 0.20 mm≤w1≤5.0 mm, and 0.15 mm≤w2≤4.5. In one embodiment, t2 is designed to be at least 1.1 times greater than t1.

In addition to the metrics described above with respect to FIGS. 7 and 13-15 and Table 1, the natural frequencies and amplitudes of swage mount modes shapes that result in off-track head motion can be analyzed to further modify the dimensions of the swage mount. For example, the flange body thickness t1, the tip thickness t2 and/or the tip width portions w1 and w2 can be modified to move these frequencies higher or to lower the amplitudes of these modes.

Another design consideration for defining dimensions of the swage mount and the 'T' shaped tip 49 is related to mass properties. Referring back to FIG. 7, by increasing t2, the center of gravity is changed. As a result, the design of the overall swage mount 41 can be altered to compensate for this change. For example, more material may be positioned on a portion opposite the 'T' shaped tip 49. Other changes in geometry may be applied to compensate for the added thickness/mass without limiting the scope of the present invention.

On the one hand, the thinner flange body (with thickness t1) results in lower mass, thereby providing more swage mount to disk clearance and improved performance. For example, the lower mass would decrease the seek time to get to the appropriate track. On the other hand, the out-of-plane robustness of the 'T' shaped tip 49 is not sacrificed because of the t2 thickness remains the same.

In sum, a swage mount is provided for attaching a head suspension assembly to a head actuator arm. The swage mount has a relatively thin flange body for providing sufficient clearance from the disk positioned underneath the swage mount. The tip extends from the flange body, and has a thickness greater than the thickness of the flange body.

Unlike the swage mounts known in the art that have a uniform thickness along the flange body and the tip, the tip of the present invention can withstand significantly higher out-of-plane loads such as twisting or bending due to its greater thickness. The swage mount of the present invention maintains favorable in-plane compliance for actuation of the tip, yet withstands out-of-plane loads. The robust swage mount of the present invention can be shipped, handled, or assembled individually with a lower cost.

What is claimed is:

1. A swage mount for a hard disk drive, the swage mount comprising:

a planar flange body having four sides and a predetermined thickness, a hub surrounding an aperture in the flange body; and a substantially 'T' shaped tip having a stem part and a cross-bar part, the stem part extending from a side of the flange body substantially in the plane of the flange body, the tip part having a predetermined thickness greater than a predetermined thickness of the flange body, the stem part of the tip tapering from a first width at a proximal end of the stem part extending from a side of the flange body, to a second narrower width at a distal end of the stem part extending from the cross-bar part.

2. The swage mount of claim 1, wherein the predetermined thickness of the tip is greater than or equal to 0.075 mm and less than or equal to 0.305 mm.

3. The swage mount of claim 1, wherein the predetermined thickness of the flange body is greater than or equal to 0.025 mm and less than or equal to 0.250 mm, and the predetermined thickness of the tip is greater than or equal to 0.075 mm and less than or equal to 0.305 mm.

4. The swage mount of claim 1, wherein the predetermined thickness of the tip is at least 1.1 times greater than the predetermined thickness of the flange body.

5. The swage mount of claim 1, wherein the hub is coupled to an actuator arm.

6. The swage mount of claim 1, wherein the predetermined thickness of the flange body is greater than or equal to 0.025 mm and less than or equal to 0.250 mm,
the predetermined thickness of the tip is greater than or equal to 0.075 mm and less than or equal to 0.305 mm,
the first width is greater than or equal to 0.20 mm and less than or equal to 5.0 mm, and
the second width is greater than or equal to 0.15 mm and less than or equal to 4.5 mm.

7. A swage mount for a hard disk drive, the swage mount comprising:

a planar flange body having four sides, a first flange body part and a second flange body part defined by the four sides, the second flange body part transitioning at a step from the first flange body part to a predetermined thickness, greater than a predetermined thickness of the first flange body part, a hub surrounding an aperture in the first flange body part; and a tip extending from a side of the second flange body part substantially in the plane of the flange body, having a predetermined thickness substantially the same as the predetermined thickness of the second flange body part, wherein the tip is substantially 'T' shaped, a stem part of the substantially 'T' shaped tip proximal to the second flange body part, and a cross-bar part of the substantially 'T' shaped tip extending from the stem part.

8. The swage mount of claim 7, wherein the stem part has a first width proximal to the second flange body part and a second width in proximity to the cross-bar part, the second width being narrower than the first width.

9. The swage mount of claim 7, wherein the predetermined thickness of the tip is greater than or equal to 0.075 mm and less than or equal to 0.305 mm.

10. The swage mount of claim 7, wherein the predetermined thickness of the first flange body part is greater than or equal to 0.025 mm and less than or equal to 0.250 mm, and the predetermined thickness of the tip is greater than or equal to 0.075 mm and less than or equal to 0.305 mm.

11. The swage mount of claim 7, wherein the predetermined thickness of the tip is at least 1.1 times greater than the predetermined thickness of the first flange body part.

* * * * *